United States Patent
Obara (10) Patent No.: US 12,545,034 B2
(45) Date of Patent: Feb. 10, 2026

(54) PRINTER, PRINTER CONTROL METHOD, AND NON-TRANSITORY COMPUTER-READABLE MEDIUM

(71) Applicant: SATO HOLDINGS KABUSHIKI KAISHA, Tokyo (JP)

(72) Inventor: Shinya Obara, Minato-ku (JP)

(73) Assignee: SATO CORPORATION, Tokyo (JP)

( * ) Notice: Subject to any disclaimer, the term of this patent is extended or adjusted under 35 U.S.C. 154(b) by 152 days.

(21) Appl. No.: 18/289,492

(22) PCT Filed: May 27, 2022

(86) PCT No.: PCT/JP2022/021777
§ 371 (c)(1),
(2) Date: Nov. 3, 2023

(87) PCT Pub. No.: WO2023/037668
PCT Pub. Date: Mar. 16, 2023

(65) Prior Publication Data
US 2024/0239113 A1    Jul. 18, 2024

(30) Foreign Application Priority Data
Sep. 8, 2021   (JP) .................................. 2021-146204

(51) Int. Cl.
*B41J 3/407*   (2006.01)
*B41J 32/02*   (2006.01)
*B41J 33/51*   (2006.01)

(52) U.S. Cl.
CPC ............. *B41J 3/4075* (2013.01); *B41J 32/02* (2013.01); *B41J 33/51* (2013.01)

(58) Field of Classification Search
CPC . B41J 3/4075; B41J 33/51; B41J 11/42; B41J 2/32; B41J 32/02; B41J 11/55; B41J 11/54; B41J 11/68; B41J 11/70; B41J 29/38; B41J 11/00; B41J 11/001; B41J 13/0009; B41J 13/103; B41J 15/04; B41J 11/0021; B41J 11/00212; B41J 11/00214; B41J 11/00218; B41J 11/0035; B41J 11/004; B41J 11/425
See application file for complete search history.

(56) References Cited

U.S. PATENT DOCUMENTS

2022/0169039 A1   6/2022   Buthrath et al.

FOREIGN PATENT DOCUMENTS

| JP | H06-210911 A | 8/1994 |
| JP | 2001-328302 A | 11/2001 |
| JP | 2002-104354 A | 4/2002 |
| JP | 2002-255139 A | 9/2002 |
| WO | WO-2020/196519 A1 | 10/2020 |

*Primary Examiner* — Kristal Feggins
(74) *Attorney, Agent, or Firm* — Foley & Lardner LLP (57) ABSTRACT

A printer that performs, based on print data, print on a plurality of labels included in a label continuous body, the printer includes a backfeed control unit configured to backfeed the label continuous body and move a leading label to a print start position, and a print control unit configured to acquire a print start command after the backfeed control unit starts the backfeed, and perform the print on the label moved to the print start position.

10 Claims, 6 Drawing Sheets

PRINTER, PRINTER CONTROL METHOD, AND NON-TRANSITORY COMPUTER-READABLE MEDIUM

TECHNICAL FIELD

The present invention relates to a printer, a printer control method, and a program.

BACKGROUND ART

JP2001-328302A discloses a printer that, in response to a print request, backfeeds a label continuous body until a label reaches a position of a thermal head, and then performs print.

SUMMARY OF INVENTION

In the above printer that performs backfeed before the print, it is required to improve a label issuing speed.

The present invention has been made in view of such a technical problem, and an object of the present invention is to improve the label issuing speed.

According to one aspect of the present invention, a printer that performs, based on print data, print on a plurality of labels included in a label continuous body, the printer comprising: a backfeed control unit configured to backfeed the label continuous body and move a leading label to a print start position; and a print control unit configured to acquire a print start command after the backfeed control unit starts the backfeed, and perform the print on the label moved to the print start position.

According to the above aspect, the print control unit acquires the print start command (a print request) after the backfeed of the label continuous body is started. That is, the backfeed of the label continuous body is performed without waiting for the print start command. Therefore, as compared with a case in which the backfeed is performed after the print start command is received, a timing at which the backfeed is ended is advanced, and a timing at which the print on the label performed after the backfeed is ended is also advanced. Therefore, the label issuing speed can be improved.

DESCRIPTION OF EMBODIMENTS

Hereinafter, a printer 1 according to an embodiment of the present invention will be described with reference to the accompanying drawings.

Figure 1:
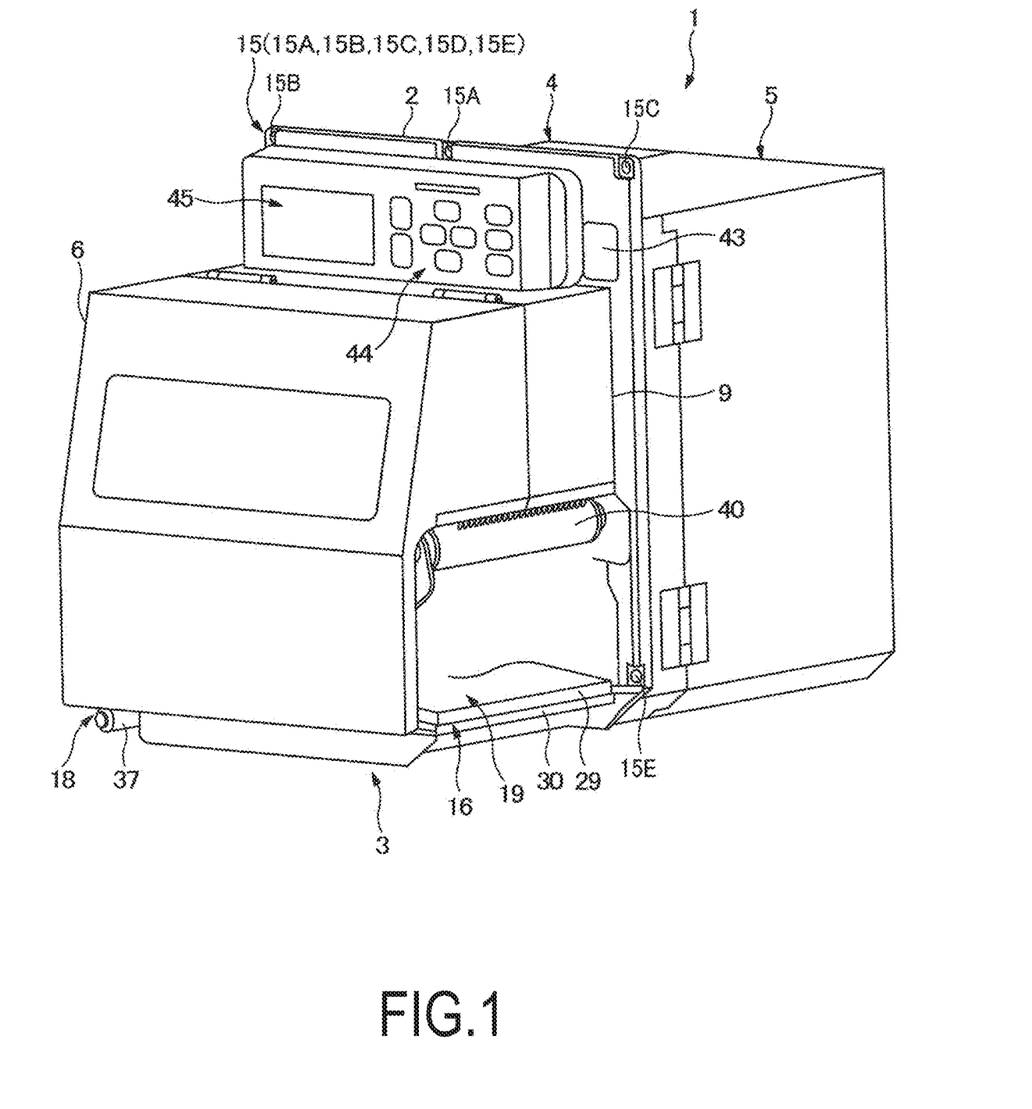
FIG. 1 is a perspective view of a printer according to an embodiment of the present invention.

FIG. 1 is a perspective view of the printer 1. As illustrated in FIG. 1, the printer 1 includes a central main body unit 2, a print unit 3, a drive unit 31 (see FIG. 3) that drives the print unit 3, a control unit 4, and a power supply unit 5.

The print unit 3 is located on one side surface of the central main body unit 2 (a front surface of the printer 1). The drive unit 31, the control unit 4, and the power supply unit 5 are located on the other side surface of the central main body unit 2 (a back surface of the printer 1).

The central main body unit 2 is a rectangular plate-shaped unit having a predetermined mechanical strength. The central main body unit 2 is located at a central portion of the printer 1, and the print unit 3, the drive unit 31, the control unit 4, and the power supply unit 5 are assembled to the central main body unit 2.

A power supply switch 43, an operation unit 44 including various operation keys, a display 45, and the like are provided above a support case 9 on the central main body unit 2.

Figure 3:
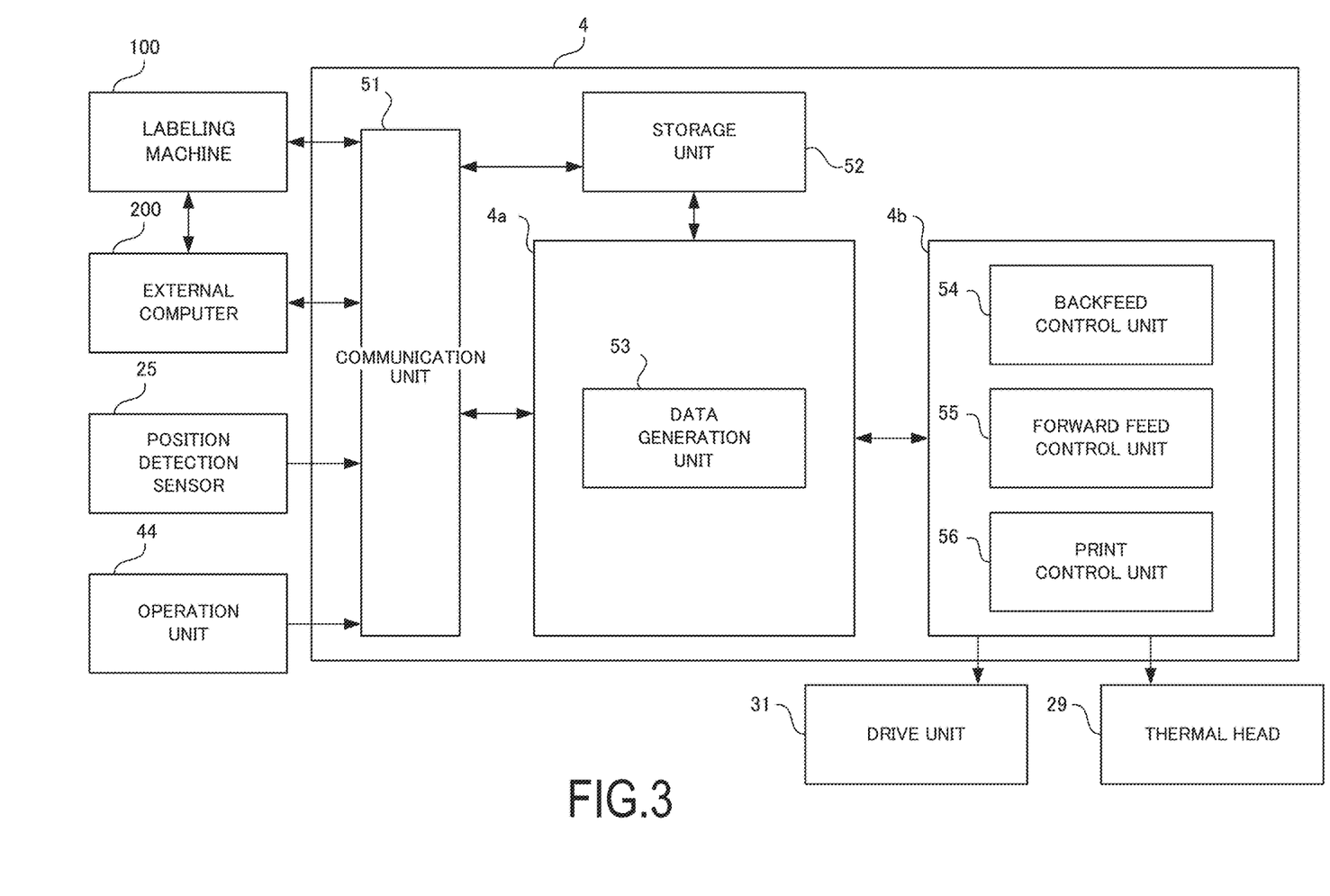
FIG. 3 is a functional block diagram of a control unit.

The central main body unit 2 is provided with a mounting portion 15 for mounting the printer 1 to a labeling machine 100 (see FIG. 3).

Any configuration can be selected for the mounting portion 15, and in the present embodiment, the mounting portion 15 is provided at a peripheral portion of the central main body unit 2. Specifically, the mounting portion 15 according to the present embodiment includes five mounting holes (an upper central mounting hole 15A, an upper left end mounting hole 15B, an upper right end mounting hole 15C, a lower left end mounting hole 15D (see FIG. 2), and a lower right end mounting hole 15E) formed in the peripheral portion of the central main body unit 2.

The drive unit 31 includes, for example, a plurality of stepping motors, and rotation operations (rotation directions, the number of steps, and the like) of the plurality of stepping motors are controlled by the control unit 4.

The power supply unit 5 is supplied with power from an outside through an outlet and supplies the power to the control unit 4, the drive unit 31, and the print unit 3.

Figure 2:
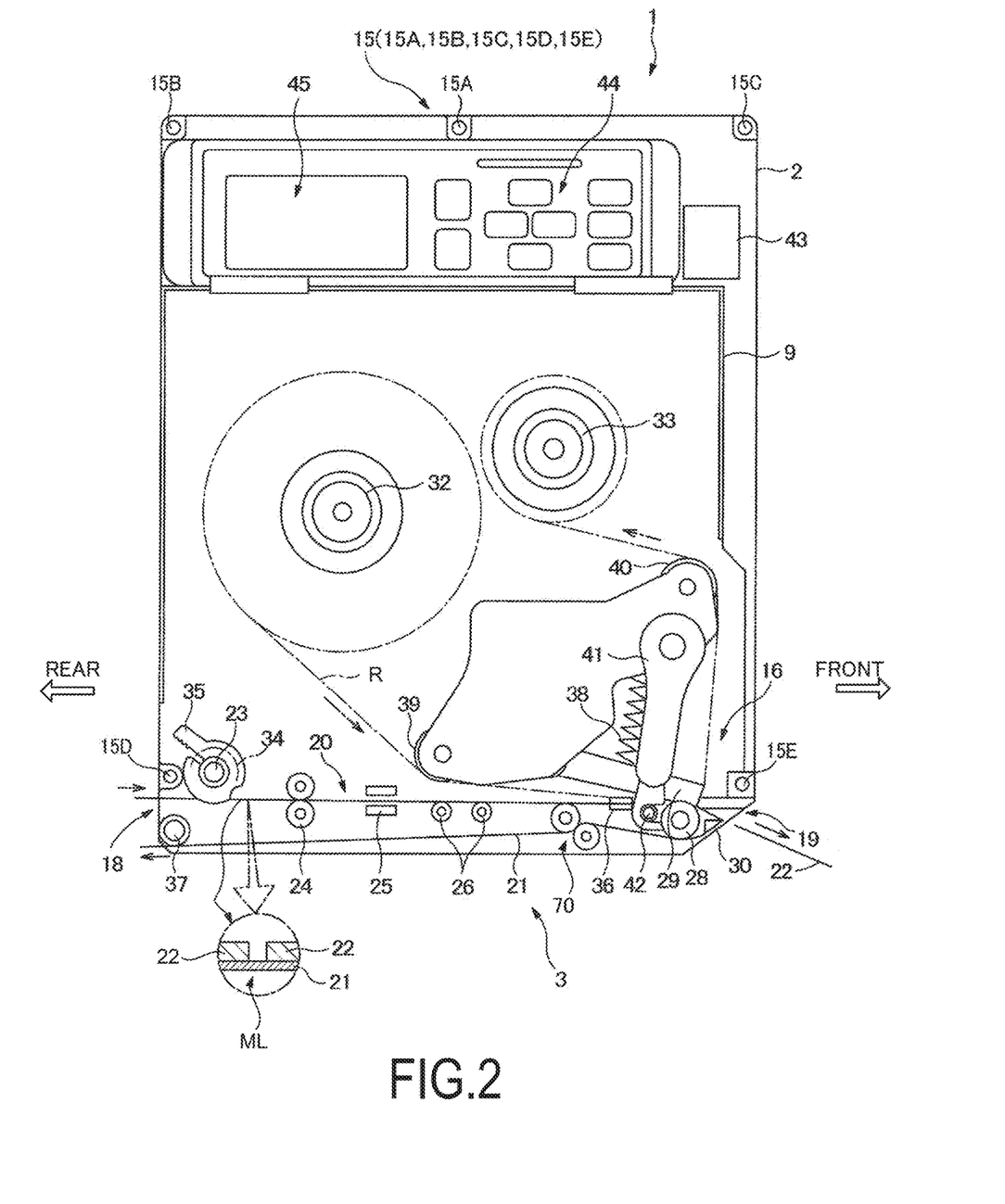
FIG. 2 is a front view of the printer from which a print unit cover is removed.

FIG. 2 is a front view of the printer 1 from which a print unit cover 6 (see FIG. 1) is removed.

As illustrated in FIG. 2, the print unit 3 includes a print portion 16 that performs print on a plurality of labels 22 included in a label continuous body ML.

The print unit 3 can print predetermined information on the label 22 in a feed path 20 from an introduction port 18 to a discharge port 19 of the label continuous body ML.

As illustrated in an enlarged cross-sectional view in FIG. 2, the label continuous body ML includes a strip-shaped liner sheet 21 as a continuous paper, and the plurality of labels 22 temporarily attached to a front surface side of the liner sheet 21. A position detection mark (not illustrated) is printed in advance on a back surface side of the liner sheet 21.

The label continuous body ML may be, for example, a roll label or a fanfold label in which perforations are formed at predetermined intervals in the liner sheet 21.

The print portion 16 includes a width regulating shaft 23, a pair of upper and lower auxiliary feed rollers 24, a position detection sensor 25, two guide rollers 26, a feed roller mechanism 70, a platen roller 28, a thermal head 29, and a peeling plate 30 in this order from an upstream side of the feed path 20 (a rear side of the printer 1).

Further, the print portion 16 includes a ribbon supply shaft 32 that supplies an unused thermal transfer ink ribbon R between the platen roller 28 and the thermal head 29, and a ribbon roll-up shaft 33 that rolls up a used thermal transfer ink ribbon R.

The width regulating shaft 23 is provided with a first width regulating fixed wall portion 34 and a width regulating movable ring 35. Positions of both left and right edge portions of the label continuous body ML are regulated by the first width regulating fixed wall portion 34, the width regulating movable ring 35, and a second width regulating fixed wall portion 36 provided on an upstream side of the platen roller 28. Accordingly, a feed posture of the label continuous body ML is appropriately regulated along the feed path 20.

The auxiliary feed rollers 24 are driven in synchronization with the platen roller 28 and assist the platen roller 28 and the thermal head 29 in feeding the label continuous body ML in forward and backward directions. Forward feed (forward direction feed) is feed to a downstream side (a front side of the printer 1), and backfeed (backward feed) is feed to the upstream side (the rear side of the printer 1).

The position detection sensor 25 can detect a relative positional relation between the label continuous body ML (label 22), the platen roller 28, and the thermal head 29 by detecting the position detection mark on the liner sheet 21.

The feed roller mechanism 70 feeds the liner sheet 21 turned by the peeling plate 30 to the rear side of the printer 1 while nipping the liner sheet 21. The liner sheet 21 is discharged to an outside of the printer 1 via a liner sheet guide roller 37.

The platen roller 28 nips the label continuous body ML and the thermal transfer ink ribbon R between the platen roller 28 and the thermal head 29 at a predetermined print pressure by a pressing spring 38. In this state, heating elements of the thermal head 29 are caused to generate heat, and the platen roller 28 is rotationally driven, whereby print on the label 22 is performed. In a case in which the label 22 is a thermosensitive medium that performs self-coloring by heat, the thermal transfer ink ribbon R is unnecessary.

The thermal transfer ink ribbon R is supplied between the platen roller 28 and the thermal head 29 from the ribbon supply shaft 32 via the first ribbon guide roller 39, and is rolled up by the ribbon roll-up shaft 33 via a second ribbon guide roller 40.

By pivoting an opening/closing lever 41 in a clockwise direction, the platen roller 28 and the thermal head 29 can be separated from each other. Accordingly, the label continuous body ML and the thermal transfer ink ribbon R can be loaded between the platen roller 28 and the thermal head 29.

When the opening/closing lever 41 is pivoted in a counterclockwise direction to engage a distal end portion of the opening/closing lever 41 with a lever engagement pin 42 mounted to a frame, the platen roller 28 and the thermal head 29 are in a print condition illustrated in FIG. 2.

The peeling plate 30 turns only the liner sheet 21 of the label continuous body ML at a distal end portion thereof. Accordingly, the label 22 is peeled off from the liner sheet 21 and discharged (issued) from the discharge port 19. The label 22 peeled off from the liner sheet 21 is transferred to the labeling machine 100. The labeling machine 100 attaches the label 22 received from the printer 1 to an adherend.

The control unit 4 is implemented by a microcomputer including a central processing unit (CPU), a read-only memory (ROM), a random access memory (RAM), and an input/output interface (an I/O interface). The control unit 4 executes various processes by the CPU reading and executing programs stored in the ROM. The control unit 4 may also be implemented by a plurality of microcomputers.

Hereinafter, the control unit 4 will be described in detail with reference to FIG. 3. FIG. 3 is a block diagram showing a part of functions of the control unit 4, and each block does not necessarily mean a physical configuration.

As illustrated in FIG. 3, the control unit 4 is communicably connected to the labeling machine 100 and an external computer 200 in a wired or wireless manner. Further, the control unit 4 receives signals from various sensors including the position detection sensor 25, the operation unit 44, and the like. The external computer 200 is also communicably connected to the labeling machine 100.

The control unit 4 controls the drive unit 31 and the thermal head 29 based on print data acquired from the external computer 200, whereby the print on the label 22 is performed.

The control unit 4 includes a communication unit 51, a storage unit 52, a data generation unit 53, a backfeed control unit 54, a forward feed control unit 55, and a print control unit 56.

In the present embodiment, the data generation unit 53 is implemented by a first processor 4a. Further, the backfeed control unit 54, the forward feed control unit 55, and the print control unit 56 are implemented by a second processor 4b. However, the data generation unit 53, the backfeed control unit 54, the forward feed control unit 55, and the print control unit 56 may be implemented by a single processor, or may be implemented by different processors.

The communication unit 51 transmits and receives various kinds of information to and from the labeling machine 100 and the external computer 200. Further, the communication unit 51 receives signals from various sensors including the position detection sensor 25, the operation unit 44, and the like.

The storage unit 52 stores, for example, print data acquired from the external computer 200, a state of the printer 1, and the like. The labeling machine 100 and the external computer 200 can store information in the storage unit 52 via the communication unit 51.

The data generation unit 53 analyzes the print data acquired from the external computer 200 via the storage unit 52 and generates control data and drawing data. Then, the data generation unit 53 transfers the control data and the drawing data to the print control unit 56 in order from the control data.

The control data includes a value indicating the number of steps of a pulse signal to be supplied to the stepping motor of the drive unit 31 during the print.

The drawing data includes a value (the number of dots) indicating a print position for selectively energizing the heating elements of the thermal head 29 for each line during the print. The drawing data has a data amount greater than that of the control data.

When the print control unit 56 ends acquisition of the control data, the backfeed control unit 54 backfeeds the label continuous body ML and moves the leading label 22 of the label continuous body ML to a print start position. An amount of the backfeed is set based on a detection result of the position detection sensor 25.

The leading label 22 is an unprinted label 22 located on an upstream side by one than the printed label 22 peeled off from the liner sheet 21 and transferred to the labeling machine 100. That is, a position of the leading label 22 when the printed label 22 is transferred to the labeling machine 100 (hereinafter referred to as a "label issuing position") is a position of the leading label 22 before the backfeed control unit 54 starts the backfeed (hereinafter referred to as a "predetermined standby position").

When an error stop request or a label feed request is generated after the backfeed control unit 54 ends the backfeed, the forward feed control unit 55 forward feeds the label continuous body ML and further moves, to the label issuing position, the leading label 22 moved to the print start position.

The error stop request is generated when an error occurs in the printer 1. The error stop request may be generated when an error occurs in the labeling machine 100 or when an error occurs in the external computer 200.

The label feed request is generated, for example, by a user inputting a command via the operation unit 44.

The print control unit 56 acquires the control data and the drawing data from the data generation unit 53. Then, when a print start command (a print request) is acquired thereafter, a print process of printing on the label 22 at the print start position and moving the label 22 to the label issuing position is executed.

Specifically, the print control unit 56 controls energization of the plurality of stepping motors of the drive unit 31 based on the control data, and controls the energization of the thermal head 29 based on the drawing data, thereby performing print on the label 22 and feeding the label 22 to the label issuing position.

The print start command is supplied from the external computer 200 to the control unit 4. That is, in the present embodiment, the print control unit 56 acquires the print start command from the external computer 200 via the communication unit 51 and the first processor 4a.

If the external computer 200 determines that the labeling machine 100 is in the predetermined standby state and the printer 1 is in a printable state, the external computer 200 transmits the print start command to the control unit 4.

When the printer 1 ends the print process, the external computer 200 supplies new print data to the control unit 4.

Figure 4:
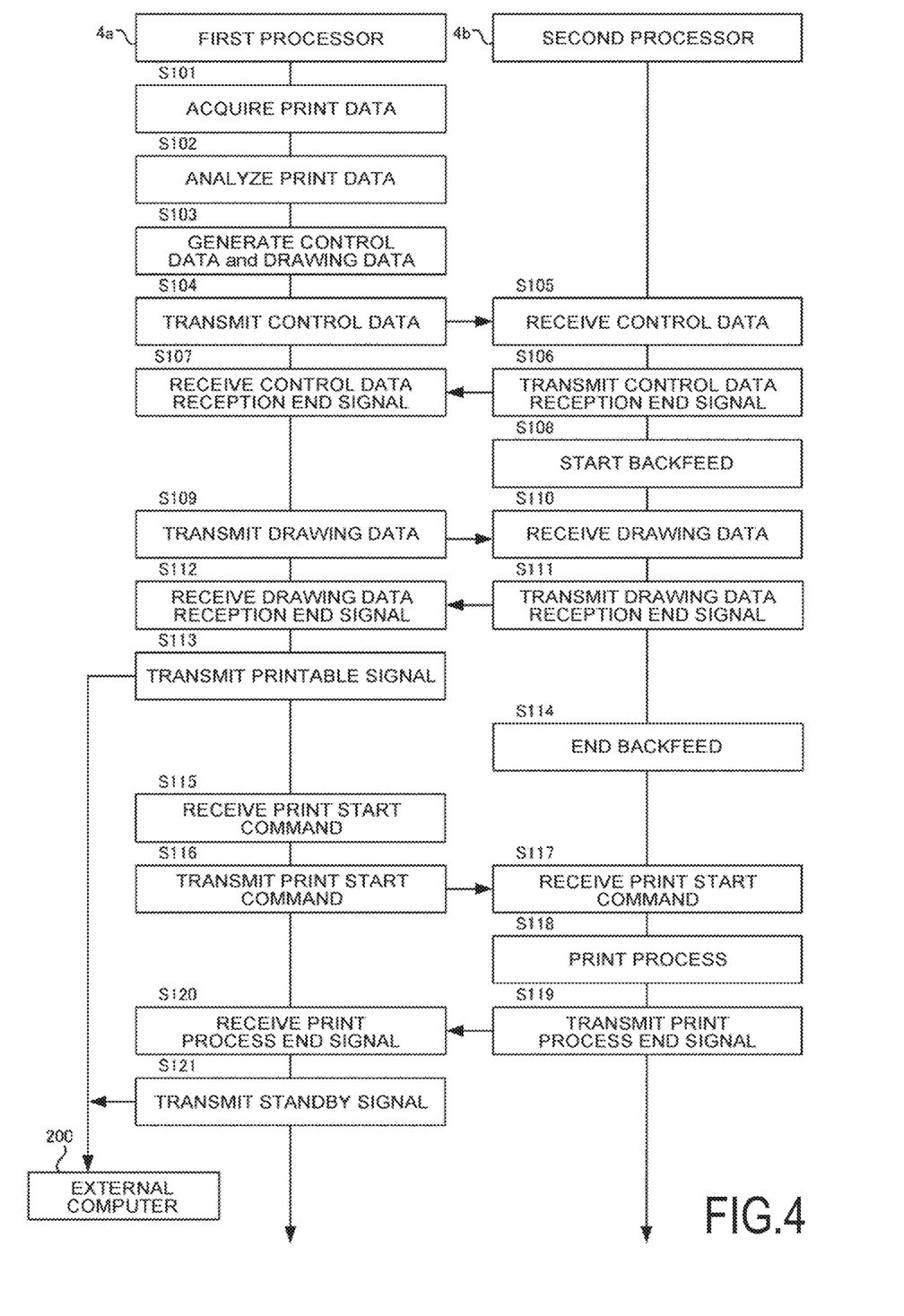
FIG. 4 is a flowchart of a label issuing process.

Next, a label issuing process executed by the control unit 4 will be described with reference to FIG. 4. FIG. 4 is a flowchart of the label issuing process.

In step S101, the first processor 4a acquires print data. The first processor 4a refers to the storage unit 52 at predetermined intervals (for example, every several tens of milliseconds to every several hundreds of milliseconds), and automatically acquires the print data when the external computer 200 stores the print data in the storage unit 52.

In step S102, the first processor 4a analyzes the acquired print data.

In step S103, the first processor 4a generates control data and drawing data based on an analysis result of the print data.

In step S104, the first processor 4a transmits the control data to the second processor 4b.

In step S105, the second processor 4b receives the control data transmitted by the first processor 4a.

In step S106, the second processor 4b transmits, to the first processor 4a, a control data reception end signal indicating that reception of the control data is ended.

In step S107, the first processor 4a receives the control data reception end signal transmitted by the second processor 4b.

In step S108, the second processor 4b starts backfeed of the label continuous body ML.

In step S109, the first processor 4a transmits the drawing data to the second processor 4b.

In step S110, the second processor 4b receives the drawing data transmitted by the first processor 4a.

In step S111, the second processor 4b transmits, to the first processor 4a, a drawing data reception end signal indicating that reception of the drawing data is ended.

In step S112, the first processor 4a receives the drawing data reception end signal transmitted by the second processor 4b.

In step S113, the first processor 4a transmits, to the external computer 200, a printable signal indicating that the printer 1 is in a printable state.

In step S114, the second processor 4b ends the backfeed of the label continuous body ML.

In step S115, the first processor 4a receives the print start command transmitted by the external computer 200.

In step S116, the first processor 4a transmits the print start command to the second processor 4b.

In step S117, the second processor 4b receives the print start command transmitted by the first processor 4a.

In step S118, the second processor 4b executes a print process.

In step S119, the second processor 4b transmits, to the first processor 4a, a print process end signal indicating that the print process is ended.

In step S120, the first processor 4a receives the print process end signal transmitted by the second processor 4b.

In step S121, the first processor 4a transmits, to the external computer 200, a standby signal indicating that the printer 1 is in a standby state.

Figure 5:
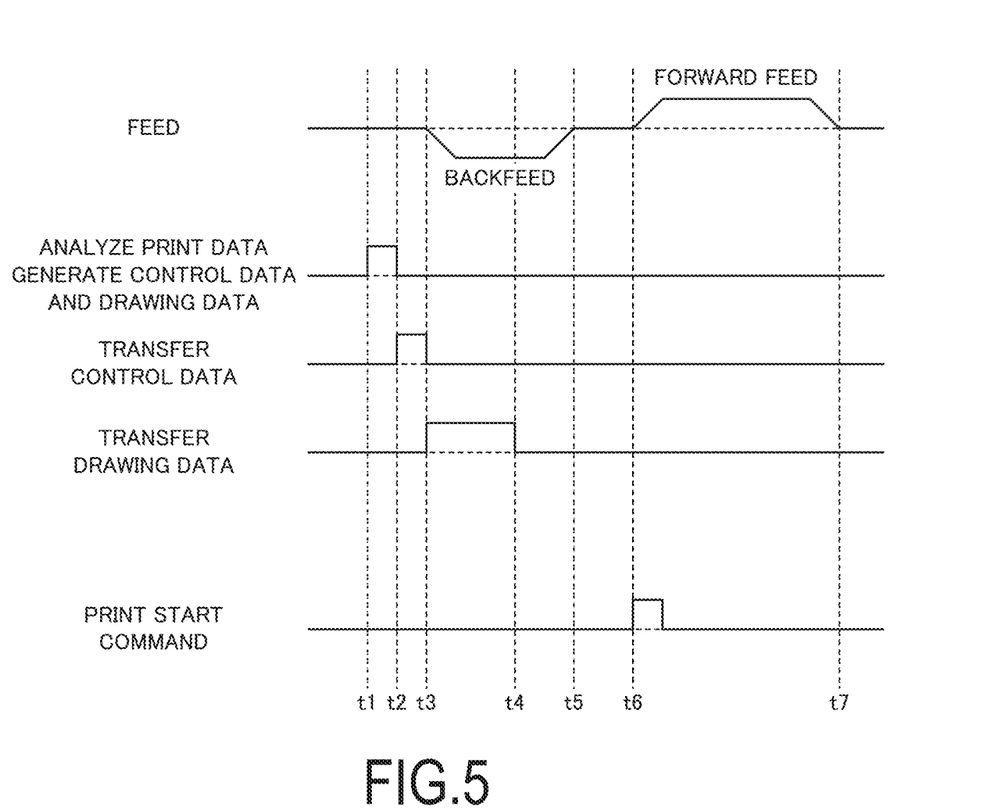
FIG. 5 is a time chart of the label issuing process.
Figure 6:
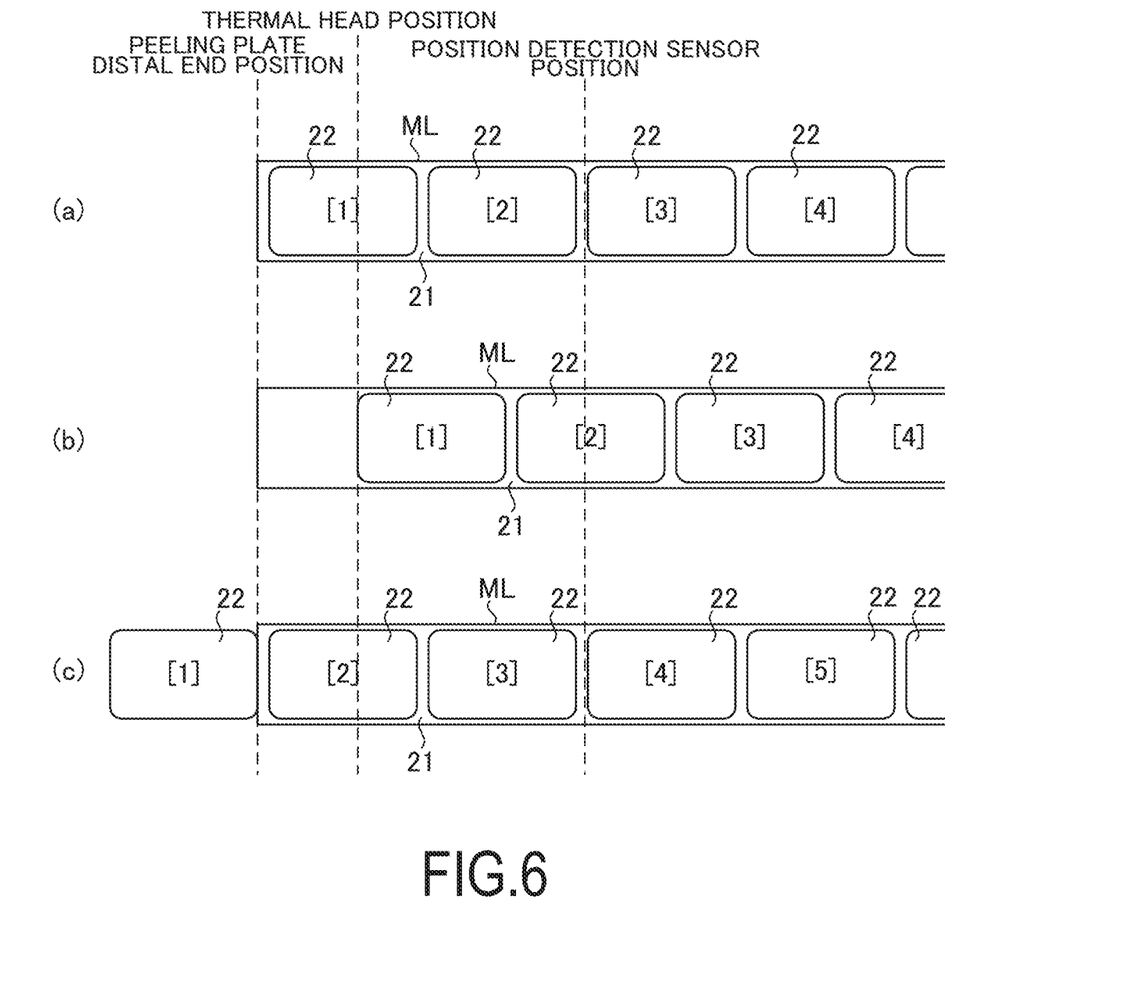
FIG. 6 is a diagram illustrating an operation of the printer in the label issuing process.

Next, with reference to FIG. 5 and FIG. 6, a state in which the label issuing process is executed will be described. FIG. 5 is a time chart of the label issuing process. FIG. 6 is a diagram illustrating an operation of the printer 1 in the label issuing process. In FIG. 6, serial numbers ([1], [2] . . . ) are attached to the labels 22 in order to facilitate understanding of a change in the position of each label 22 along with the feed of the label continuous body ML.

Before a time point t1 in FIG. 5, as illustrated in a state (a) in FIG. 6, the printer 1 is in the standby state, and the leading label 22 [1] of the label continuous body ML is at the predetermined standby position.

At the time point t1, the first processor 4a acquires print data.

The first processor 4a analyzes the print data and generates control data and drawing data from the time point t1 to a time point t2.

At the time point t2, transfer of the control data from the first processor 4a to the second processor 4b is started.

At a time point t3, the transfer of the control data from the first processor 4a to the second processor 4b is ended, and transfer of the drawing data from the first processor 4a to the second processor 4b is started.

Further, at the time point t3, the printer 1 starts the backfeed of the label continuous body ML.

At a time point t4, the transfer of the drawing data from the first processor 4a to the second processor 4b is ended.

A reason why a time required for transferring the drawing data is longer than a time required for transferring the control data is that a data amount of the drawing data is greater than a data amount of the control data.

At a time point t5, the backfeed of the label continuous body ML is ended. Accordingly, as illustrated in a state (b) in FIG. 6, the label 22 [1] is at a print start position.

At a time point t6, the second processor 4b acquires a print start command. Accordingly, the printer 1 starts a print process (a forward feed).

In the present embodiment, as illustrated in FIG. 6, the print process is started when a signal of the print start command is turned ON. However, the print process may be started when the signal of the print start command is turned OFF.

At a time point t7, the print process is ended. Accordingly, as illustrated in a state (c) in FIG. 6, the printed label 22 [1] is at the label issuing position.

In the present embodiment, the backfeed is ended at the time point t5 (step S114 in FIG. 3), and the second processor 4b acquires the print start command at the time point t6 (step S117 in FIG. 3) thereafter. This is because a timing at which the external computer 200 determines that the labeling machine 100 is in the predetermined standby state and the printer 1 is in the printable state and outputs the print start command is later than a timing at which the backfeed is ended.

However, when the external computer 200 can output the print start command at an earlier timing, the second processor 4b can acquire the print start command before the backfeed is ended. That is, the timing at which the backfeed is ended (step S114 in FIG. 3) may be after the second processor 4b acquires the print start command (step S117 in FIG. 3). In this case, the second processor 4b starts the print process after the backfeed is ended.

As described above, the second processor 4b (the print control unit 56) of the printer 1 acquires the print start command (the print request) after the backfeed of the label continuous body ML is started. That is, the backfeed of the label continuous body ML is performed without waiting for the print start command. Therefore, as compared with a case in which the backfeed is performed after the print start command is received, the timing at which the backfeed is ended is advanced, and a timing at which the print (the print process) on the label 22 performed after the backfeed is ended is also advanced. Therefore, with the printer 1 according to the present embodiment, an issuing speed of the label 22 can be improved.

Next, another operation process of the printer 1 will be described.

When the print data is disappeared after the backfeed control unit 54 ends the backfeed and before the print control unit 56 starts the print, the printer 1 stores, in the storage unit 52, a state in which the backfeed is ended, and performs the print without performing the backfeed when new print data is acquired thereafter.

According to this, since the label 22 is already at the print start position at the time when the print data is acquired, the print process can be promptly started. Therefore, the issuing speed of the label 22 can be improved.

The state in which the backfeed is ended may be stored in a storage unit other than the storage unit 52. The print data is disappeared, for example, when the external computer 200 deletes the print data or when an operation of deleting the print data is performed via the operation unit 44.

When an error that allows the backfeed to be continued occurs after the backfeed control unit 54 starts the backfeed and before the backfeed control unit 54 ends the backfeed, the printer 1 does not stop due to the error until the backfeed is ended.

Accordingly, the position of the label 22 can be managed in either a state before the backfeed or a state after the backfeed. That is, the position management of the label 22 can be simplified.

When the print data is acquired in a pause state in which the print data is not present, the printer 1 shifts from the pause state to an operation state and performs the backfeed by the backfeed control unit 54.

This is because the leading label 22 of the label continuous body ML is at the predetermined standby position in the pause state in which the print data is not present.

Main functions and effects of the printer 1 configured as described above will be collectively described.

The printer 1 that performs, based on the print data, the print on the plurality of labels 22 included in the label continuous body ML includes the backfeed control unit 54 that backfeeds the label continuous body ML and moves the leading label 22 to the print start position, and the print control unit 56 that acquires the print start command after the backfeed control unit 54 starts the backfeed, and performs the print on the label 22 moved to the print start position.

According to this, the print control unit 56 acquires the print start command (the print request) after the backfeed of the label continuous body ML is started. That is, the backfeed of the label continuous body ML is performed without waiting for the print start command. Therefore, as compared with the case in which the backfeed is performed after the print start command is received, the timing at which the backfeed is ended is advanced, and the timing at which the print (the print process) on the label 22 performed after the backfeed is ended is also advanced. Therefore, the issuing speed of the label 22 can be improved.

The printer 1 includes the data generation unit 53 that generates, based on the print data, data (control data and drawing data) to be supplied to the print control unit 56. The backfeed control unit 54 starts the backfeed after the print control unit 56 ends acquisition of the control data and before the print control unit 56 ends acquisition of the drawing data, and the print control unit 56 acquires the print start command after the acquisition of the drawing data is ended.

It is considered that when the print control unit 56 acquires the control data, the print start command is also acquired thereafter. Therefore, on a premise that when the print control unit 56 ends the acquisition of the control data, the print control unit 56 acquires the print start command, by the backfeed control unit 54 starting the backfeed without waiting for the end of the acquisition of the drawing data to be subsequently acquired, a timing at which the backfeed is ended can be advanced to a maximum extent. In other words, by performing the backfeed in parallel with the print control unit 56 acquiring data from the data generation unit 53, the timing at which the backfeed is ended can be advanced to the maximum extent. As a result, when the print control unit 56 ends the acquisition of the drawing data and acquires the print start command, the print process is promptly started according to progress of the backfeed. Therefore, the issuing speed of the label 22 can be improved.

The printer 1 includes the first processor 4a and the second processor 4b that are communicably connected to each other. The first processor 4a constitutes the data generation unit 53, and the second processor 4b constitutes the backfeed control unit 54 and the print control unit 56.

According to this, the transfer of the control data and the drawing data from the data generation unit 53 to the print control unit 56 requires a longer time than a case in which the data generation unit 53 and the print control unit 56 are implemented by a single processor. Therefore, it can be said that in this case, an effect of improving the issuing speed of the label 22 is greater than that in the case in which the data generation unit 53 and the print control unit 56 are implemented by a single processor. More specifically, when the backfeed control unit 54 performs the backfeed after the transfer of the control data and the drawing data from the data generation unit 53 to the print control unit 56 is ended and the print control unit 56 receives the print start command, the slower a data transfer speed from the data generation unit 53 to the print control unit 56, the greater a ratio of a data transfer time to a time required for issuing the label 22. The expression "the backfeed control unit 54 starting the backfeed without waiting for the end of the acquisition of the drawing data" means that the time required for issuing the label 22 can be shortened by a time required for transferring the drawing data. That is, the slower the data transfer speed from the data generation unit 53 to the print control unit 56, the greater a ratio of the time required for issuing the label 22 that can be shortened. Therefore, it can be said that in the case in which the first processor 4a constitutes the data generation unit 53 and the second processor 4b constitutes the print control unit 56, the effect of improving the issuing speed of the label 22 is greater than that in the case in which the data generation unit 53 and the print control unit 56 are implemented by a single processor.

The printer 1 includes the storage unit 52 that stores the state of the printer 1. When the print data is disappeared after the backfeed control unit 54 ends the backfeed and before the print control unit 56 starts the print, the printer 1 stores, in the storage unit 52, a state in which the backfeed is ended, and performs the print without performing the backfeed when new print data is acquired thereafter.

According to this, since the label 22 is already at the print start position at the time when the print data is acquired, the print process can be promptly started. Therefore, the issuing speed of the label 22 can be improved.

The printer 1 includes the forward feed control unit 55 that forward feeds the label continuous body ML and further moves, to the label issuing position, the label 22 moved to the print start position when an error stop request or a label feed request is generated after the backfeed control unit 54 ends the backfeed.

A forward feed amount until the leading label 22 is moved to the label issuing position differs between before the backfeed and after the backfeed. Therefore, when an error stop request or a label feed request is generated after the backfeed is ended, the forward feed amount can be appropriately adjusted by the forward feed control unit 55 performing forward feed.

When an error that allows the backfeed to be continued occurs after the backfeed control unit 54 starts the backfeed and before the backfeed control unit 54 ends the backfeed, the printer 1 does not stop due to the error until the backfeed is ended.

According to this, the position management of the label 22 can be simplified.

When the print data is acquired in a pause state in which the print data is not present, the printer 1 shifts from the pause state to an operation state and performs the backfeed by the backfeed control unit 54.

In the pause state in which the print data is not present, the leading label 22 of the label continuous body ML is at the predetermined standby position. Therefore, when the printer 1 shifts from the pause state to the operation state, the printer 1 performs the backfeed by the backfeed control unit 54.

While an embodiment of the invention has been described, the embodiment is merely one of application examples of the invention, and does not intend to limit a technical scope of the invention to a specific configuration according to the embodiment.

For example, various programs of the printer 1 may be stored in a non-transitory recording medium such as a CD-ROM.

The present application makes a priority claim based on Japanese Patent Application No. 2021-146204 filed in the Japan Patent Office on Sep. 8, 2021, and the entire disclosure of this application is incorporated herein by reference.

The invention claimed is:

1. A printer that, based on print data, prints a plurality of labels included in a label continuous body, the printer comprising:
  a print unit comprising a thermal head and a platen roller;
  a backfeed control unit configured to control the print unit to backfeed the label continuous body and move a leading label to a print start position;
  a print control unit configured to acquire a print start command after the backfeed control unit starts the backfeed, and control the print unit to print on the leading label moved to the print start position; and
  a data generation unit configured to generate, based on the print data, data to be supplied to the print control unit, the data including control data and drawing data;
  wherein:
    the backfeed control unit controls the print unit to backfeed in parallel with the print control unit acquiring the drawing data from the data generation unit; and
    the backfeed control unit controls the print unit to start the backfeed after the print control unit ends acquisition of the control data and before the print control unit ends acquisition of the drawing data.

2. The printer according to claim 1, wherein a data amount of the drawing data is greater than a data amount of the control data.

3. The printer according to claim 1, wherein the print control unit acquires the print start command after the acquisition of the drawing data is ended.

4. The printer according to claim 1, further comprising:
  a first processor and a second processor communicably connected to each other, wherein:
  the first processor constitutes the data generation unit, and the second processor constitutes the backfeed control unit and the print control unit.

5. The printer according to claim 1, further comprising:
  a storage unit configured to store a state of the printer, wherein:
  when the print data is disappeared after the backfeed control unit controls the print unit to end the backfeed and before the print control unit controls the print unit to start the print, the printer stores, in the storage unit, a state in which the backfeed is ended, and performs the print without performing the backfeed when new print data is acquired thereafter.

6. The printer according to claim 1, further comprising:
  a forward feed control unit configured control the print unit to forward feed the label continuous body and further move, to a label issuing position, the leading label moved to the print start position when an error stop request or a label feed request is generated after the backfeed control unit controls the print unit to end the backfeed.

7. The printer according to claim 1, wherein when an error that allows the backfeed to be continued occurs after the backfeed control unit controls the print unit to start the backfeed and before the backfeed control unit controls the print unit to end the backfeed, the printer does not stop due to the error until the backfeed is ended.

8. The printer according to claim 1, wherein when the print data is acquired in a pause state in which the print data is not present, the printer shifts from the pause state to an operation state and performs the backfeed by the backfeed control unit controlling the print unit.

9. A printer control method executed by a computer in a printer, the printer that, based on print data, prints a plurality of labels included in a label continuous body, the printer comprising a backfeed control unit, a print control unit, a data generation unit, and a print unit that comprises a thermal head and a platen roller, the control method comprising:

controlling, by the backfeed control unit, the print unit to backfeed the label continuous body and move a leading label to a print start position;

acquiring, by the print control unit, a print start command after the backfeed is started and controlling, by the print control unit, the print unit to print on the leading label moved to the print start position; and generating, by the data generation unit, based on the print data, data to be supplied to the print control unit including control data and drawing data;

wherein:
the backfeed control unit controls the print unit to backfeed in parallel with the print control unit acquiring the drawing data from the data generation unit; and the backfeed control unit controls the print unit to start the backfeed after the print control unit ends acquisition of the control data and before the print control unit ends acquisition of the drawing data.

10. A non-transitory computer-readable medium storing a program executable by a computer in a printer, the printer comprising a backfeed control unit, a print control unit, a data generation unit, and a print unit that comprises a thermal head and a platen roller, the printer that, based on print data, prints a plurality of labels included in a label continuous body, the program causing the computer to execute:

controlling, by the backfeed control unit, the print unit to backfeed the label continuous body and moving a leading label to a print start position;

acquiring, by the print control unit, a print start command after the backfeed is started and controlling, by the print control unit, the print unit to print on the leading label moved to the print start position; and generating, by the data generation unit, based on the print data, data to be supplied to the print control unit including control data and drawing data;

wherein:
the backfeed control unit controls the print unit to backfeed in parallel with the print control unit acquiring the drawing data from the data generation unit; and the backfeed control unit controls the print unit to start the backfeed after the print control unit ends acquisition of the control data and before the print control unit ends acquisition of the drawing data.

* * * * *